US011352305B2

(12) United States Patent
Roach et al.

(10) Patent No.: US 11,352,305 B2
(45) Date of Patent: Jun. 7, 2022

(54) FERTILIZER WITH POLYAMINE ADDITIVE FOR USE IN IRRIGATION ENVIRONMENTS

(71) Applicant: Nachurs Alpine Solutions, Marion, OH (US)

(72) Inventors: Tommy Roach, Lubbock, TX (US); Gregory A. Bame, Marion, OH (US)

(73) Assignee: NACHURS ALPINE SOLUTIONS, CORP., Marion, OH (US)

(*) Notice: Subject to any disclaimer, the term of this patent is extended or adjusted under 35 U.S.C. 154(b) by 2 days.

(21) Appl. No.: 16/864,782

(22) Filed: May 1, 2020

(65) Prior Publication Data

US 2020/0299206 A1  Sep. 24, 2020

Related U.S. Application Data

(63) Continuation-in-part of application No. 15/572,230, filed as application No. PCT/US2016/031956 on May 12, 2016, now abandoned.

(60) Provisional application No. 62/161,119, filed on May 13, 2015.

(51) Int. Cl.
| | |
|---|---|
| *C05G 1/00* | (2006.01) |
| *C05G 3/40* | (2020.01) |
| *C05G 5/23* | (2020.01) |
| *C05F 11/10* | (2006.01) |
| *C05C 3/00* | (2006.01) |
| *C05B 7/00* | (2006.01) |
| *C05B 17/00* | (2006.01) |
| *C05C 9/00* | (2006.01) |

(52) U.S. Cl.
CPC .............. *C05G 3/44* (2020.02); *C05B 7/00* (2013.01); *C05B 17/00* (2013.01); *C05C 3/00* (2013.01); *C05C 9/00* (2013.01); *C05F 11/10* (2013.01); *C05G 1/00* (2013.01); *C05G 5/23* (2020.02)

(58) Field of Classification Search
CPC .... C05G 3/44; C05G 5/23; C05G 1/00; C05F 11/10; C05F 11/00; C05C 3/00; C05C 9/00; C05B 7/00; C05B 17/00; C05D 1/00; C05D 9/02
See application file for complete search history.

(56) References Cited

U.S. PATENT DOCUMENTS

| | | | | |
|---|---|---|---|---|
| 2,828,182 A | ‡ | 3/1958 | Cheronis | C05D 9/02 71/1 |
| 3,403,992 A | ‡ | 10/1968 | Busch | C05G 3/80 71/1 |
| 5,997,600 A | ‡ | 12/1999 | Dean | C05G 3/0064 71/27 |
| 2011/0073795 A1 | ‡ | 3/2011 | Thomas | A62D 1/0071 252/3 |
| 2014/0274719 A1 | * | 9/2014 | Davison | C05G 3/00 504/297 |

FOREIGN PATENT DOCUMENTS

| | | | |
|---|---|---|---|
| CN | 101624305 A | ‡ | 1/2010 |
| CN | 101624305 A | | 4/2012 |
| CN | 103159557 A | ‡ | 6/2013 |
| CN | 103159557 A | | 6/2013 |
| WO | WO9821166 A1 | ‡ | 5/1998 |
| WO | WO9821166 A1 | | 5/1998 |

OTHER PUBLICATIONS

Amazon.com. "IBI Scientific IB70184 0.5M EDTA Solution, 8.0 pH, 100mL" <https://www.amazon.com/IBI-Scientific-Solution-Molecular-Concentrate/dp/B0074NY7DM?th=1 > Accessed Jul. 26, 2021 (Year: 2021).*
Campbell, Jarryd, and Dan Peterson. "Determination of water hardness from common water sources using flame atomic absorbance spectrometry." Concordia College Journal of Analytical Chemistry 1 (2010): 4-8. (Year: 2010).*
Carl Rosen and Peter Bierman. "Foliar Fertilization—Pro's and Con's" When and How to Use Foliar Fertilizers. Department of Soil, Water, and Climate. University of Minnesota <https://www.walterreeves.com/tools-and-chemicals/foliar-fertilization-pros-and-cons/> Jul. 9, 2011 (Year: 2011).*
Nachurs. "Product Reference Sheets". https://www.slideshare.net/glind1014/product-information-sheet-booklet-2013-with-micros > pp. 1-68 (2013).‡
Obreza, Thomas, Larry Parsons, and Kelly Morgan. "Nitrogen Fertilizer Sources: What does the future hold for citrus producers?." Soil and Water Science Department, Florida Cooperative Extension Service, Institute of Food and Agricultural Sciences, University of Florida (2009).‡
Nachurs "Product Reference Sheets", pp. 1-68 (2013).

\* cited by examiner
‡ imported from a related application

*Primary Examiner* — Jennifer A Smith
(74) *Attorney, Agent, or Firm* — Law Office of J.L. Simunic; Joan Simunic

(57) ABSTRACT

The present development is a composition for a commercial fertilizer product that provides for nitrogen, phosphate and/or potassium availability to the plant even in a hostile growing environment with hard water sources. The fertilizer of the present invention includes a polyamine additive, water, and soluble nitrogen, potassium, and/or phosphate, that are essentially unaffected by hard water thereby retaining their availability to the target plants.

8 Claims, No Drawings

FERTILIZER WITH POLYAMINE ADDITIVE FOR USE IN IRRIGATION ENVIRONMENTS

CROSS-REFERENCE TO PRIOR APPLICATIONS

The present application is a continuation in part of U.S. patent application Ser. No. 15/572,230 filed Nov. 7, 2017, now expired, which is a national stage entry of PCT/US16/031956 filed May 12, 2016, which claims the benefit of U.S. Patent Application 62/161,119 filed May 13, 2015, each of which is incorporated by reference in its entirety.

FIELD OF THE INVENTION

The invention relates to a plant fertilizer product comprising sources of nitrogen, phosphate, and potassium suitable for use in irrigation environments, particularly those where water quality is of concern. To protect the NPK sources, a polyamine compatibility agent is included in the composition. The fertilizer is provided as a low pH solution which can be applied via known irrigation methods.

BACKGROUND OF THE INVENTION

In order to maintain healthy growth, plants must extract a variety of elements from the soil in which they grow. However, many soils are deficient in the necessary elements or the soils contain them only in forms which cannot be readily taken up by plants. To counteract these deficiencies, commercial fertilizing products containing select elements are commonly applied to soils in order to improve growth rates and yields obtained from crop plants. For example, phosphates may be added to soil to counteract a lack of available phosphorus.

With declining water resources via natural rainfall or irrigation in arid and/or semi-arid regions, new methods are being sought to improve nutrient and water use in agriculture. One such method is through the use of drip irrigation, both as a water transport source and as a method to apply fertilizer at specific times when the plant needs it the most. Drip irrigation uses water which is pulled from aquifer pools located below the surface and also in surface waters, for example from the Ogallala Aquifer. Water levels in the Ogallala Aquifer have continued to decline over the past 20 years, and are projected to run out by 2025 in many areas of Texas, Kansas, and Colorado. The water quality also continues to decline in these same areas due to elevated pH and higher concentration of dissolved solids, such as calcium, magnesium, iron, bicarbonate, and combinations thereof, in the available irrigation water. This water is characterized as "hard water".

In hard water regions, traditional nutrient sources used in fertilizers, such as potassium chloride, ammonium sulfate, ammonium polyphosphate, and potassium sulfate are not effective because they form insoluble precipitates that cannot be absorbed by the plants. Where high volumes of dissolved solids exists, whether it be from hard water sources or from calcareous, high pH soils, plant-available nitrogen, potassium and phosphate availability become an issue. Thus, it would be beneficial to have a fertilizer composition that comprises nutrients that are not affected by hard water.

SUMMARY OF THE PRESENT INVENTION

The present development is a composition for a commercial fertilizer product that provides for nitrogen, phosphate and/or potassium availability to the plant even in a hostile growing environment, i.e. an environment with high total dissolved solids and/or hard water sources. The fertilizer of the present invention comprises a polyamine additive and water, and optionally soluble nitrogen, potassium, and/or phosphate, that are essentially unaffected by hard water thereby retaining their availability to the target plants.

DETAILED DESCRIPTION OF THE PRESENT DEVELOPMENT

The present development is a composition for an aqueous commercial fertilizer product that is intended to be applied in hard water regions by irrigation methods, including but not limited to subsurface drip, drip tape, micro-jet, center pivot, surface drip, flood, and sprinkler. The fertilizer of the present invention comprises a polyamine compatibility agent and water, and optionally soluble nitrogen, at least one potassium salt, and/or a phosphate source, such as orthophosphate. Optionally, the fertilizer may further comprise a sulfur source, a zinc source, a calcium source, a boron source, a manganese source, an iron source, a copper source, a cobalt source, a magnesium source, or a combination thereof.

The composition comprises a polyamine compatibility agent, also referred to as a "polyamine component" herein, selected from a poly-aspartic acid or amino polycarboxylic acid or a combination thereof, wherein the polyamine component remains unchelated in the aqueous fertilizer product to a sufficient degree that the polyamine component forms chelates with divalent cations in water having at least 60 ppm hardness as defined by the United States Geological Survey. The polyamine component enhances the availability of the nitrogen, phosphorus and potassium to the plant most likely by forming chelates with the divalent cations in the hard water and thereby minimizing the negative impacts of the cations with the fertilizer components. In a preferred embodiment, the polyamine component comprises from about 1.0 wt % to about 10.0 wt % of the composition.

The nitrogen source must be essentially non-reactive with common hard water components—that is, when the nitrogen source is exposed to hard water it must not react to form insoluble particulates or precipitates. Recommended soluble nitrogen sources are urea, triazone urea, ammonium hydroxide, and combinations thereof. Optionally, other sources of soluble nitrogen as are known in the art may be used, provided that the nitrogen source should not produce insoluble particulates in the presence of hard water. The concentration of the soluble nitrogen source will vary depending on the source selected, but the resulting available nitrogen in the final composition should be up to about 10 wt %, and is more preferably from about 1.5 wt % to about 8.0 wt %.

The phosphate source may be any phosphate known in the art for use in fertilizers. A preferred phosphate form is orthophosphate, and particularly orthophosphate made from purified phosphoric acid. Because of their reactivity, it is recommended that polyphosphates, and particularly those made from super phosphoric acid, not be used or be minimized in any composition of the present development. In a preferred embodiment, the phosphate source is a phosphoric acid solution having a pH<6.0. In a most preferred embodiment, the phosphate source is a 60 wt % to 85 wt % phosphoric acid solution and the final product should have a pH between 5.5 and 6.8. The resulting available phosphorus in the final composition should be from about 0.0 wt % to about 25.0 wt %.

The potassium source must be essentially non-reactive with common hard water components—that is, when the potassium source is exposed to hard water it must not react to form insoluble particulates or precipitates. Representative potassium sources include potassium hydroxide, potassium phosphate, and carboxylic acid salts of potassium selected from the group consisting of (1) HCOOK, or (2) $CH_3(CH_2)_x$COOK wherein x=0-4, or (3) $MOOC(CR^1R^2)_x$COOK wherein $R^1$=—H or —OH or —COOM and $R^2$=—H or —OH or —COOM and x=0-4 and M=H or K, or (4) $HO(CR^1R^2)_x$COOK wherein $R^1$=H or a C1 to C4 alkyl group and $R^2$=H or a C1 to C4 alkyl group and x=1-5, or (5) $CH_3CO(CR^1R^2)_x$COOK wherein $R^1$=H or a C1 to C4 alkyl group and $R^2$=H or a C1 to C4 alkyl group and x=1-3. Exemplary carboxylic acid salts of potassium as defined herein include potassium formate, potassium acetate, potassium propionate, potassium butyrate, potassium valerate, potassium hexanoate, potassium oxalate, potassium malonate, potassium succinate, potassium glutarate, potassium adipate, potassium lactate, potassium malate, potassium citrate, potassium glycolate, potassium tartrate, potassium glyoxylate, and potassium pyruvate. In a preferred embodiment, the potassium source is selected from potassium acetate, potassium formate, potassium citrate, potassium succinate, potassium propionate, and combinations thereof. In a more preferred embodiment, potassium acetate is used. The present composition has available potassium in the form of $K_2O$ at a concentration of from about 1.0 wt % to about 23 wt %.

Optionally, the fertilizer may further comprise a supplemental nutrient at a concentration of from 0.0 wt % to about 9.0 wt % wherein the supplemental nutrient is derived from a sulfur source, a zinc source, a boron source, a calcium source, a manganese source, an iron source, a copper source, a cobalt source, a magnesium source, or a combination thereof. Sources of supplemental nutrients are well known in the art. Some representative examples, without limitation, include potassium thiosulfate, ammonium thiosulfate, zinc ethylenediaminetetraacetic acid (ZnEDTA), calcium ethylenediaminetetraacetic acid (CaEDTA), ammonium calcium nitrate, manganese ethylenediaminetetraacetic acid (MnEDTA), iron ethylenediaminetetraacetic acid (FeEDTA), cobalt ethylenediaminetetraacetic acid (CoEDTA), cobalt sulfate, magnesium ethylenediaminetetraacetic acid (MgEDTA), ethylenediaminetetraacetic acid (CuEDTA), disodium octaborate tetrahydrate, boric acid, and combinations thereof.

Water is added to balance the composition and to produce the aqueous fertilizer product. By slowly adding water to the other composition ingredients and then mixing at ambient temperature while ensuring that the temperature is held below 50° C., a finished product comprising at least 20 wt % water is produced. In a preferred embodiment, the finished product comprises from about 23 wt % water to about 99 wt % water. In a more preferred embodiment, the finished product comprises at from about from about 40 wt % water to about 80 wt % water. In a most preferred embodiment, the finished product comprises at from about from about 55 wt % water to about 80 wt % water. The aqueous fertilizer composition can be applied by irrigation methods, including but not limited to subsurface drip, drip tape, micro-jet, center pivot, surface drip, flood, and sprinkler.

The following exemplary embodiments, not intended to be limiting with respect to scope of the development, are prepared by slowly adding to water the other composition ingredients, and then mixing at ambient temperature for at least 60 minutes ensuring that the temperature is held below 50° C. The solution is then filtered through a 10-micron filter before packaging.

TABLE I

| Polyamine Component | wt % | Nitrogen Source | Available N (wt %) | Phosphate Source | Available P (wt %) | Potassium Source | Available K (wt %) | Secondary Nutrient | Secondary Nutrient (wt %) |
|---|---|---|---|---|---|---|---|---|---|
| poly-aspartic acid | 2.5 | urea | 8.0 | ortho-phosphate | 15.0 | potassium formate | 3.0 | CaEDTA CuEDTA | 1.4 6.8 |
| poly-aspartic acid | 4.0 | $NH_4OH$ | 3.2 | phosphoric acid | 10.0 | potassium acetate | 13.4 | potassium thiosulfate FeHEDTA | 0.2 2.6 |
| amino polycarboxylic acid | 4.0 | — | 0.0 | — | 0 | potassium succinate | 15.0 | ZnEDTA | 2.7 |
| amino polycarboxylic acid | 1.0 | urea | 5.9 | ortho-phosphate | 24.0 | potassium lactate | 6.3 | MnEDTA | 5.4 |
| poly-aspartic acid; amino polycarboxylic acid | 1.8 1.8 | urea + $NH_4OH$ | 7.0 | ortho-phosphate | 19.8 | potassium acetate | 4.2 | potassium thiosulfate ZnEDTA | 2.7 0.8 |
| poly-aspartic acid; amino polycarboxylic acid | 2.5 1.5 | $NH_4OH$ | 2.0 | — | 0.0 | potassium formate | 20.0 | FeEDDHSA CoEDTA MgEDTA | 6.3 1.8 0.9 |
| poly-aspartic acid; amino polycarboxylic acid | 1.2 2.5 | urea | 10.0 | phosphoric acid | 10.0 | potassium malate | 10.0 | potassium thiosulfate | 8.5 |
| poly-aspartic acid; amino polycarboxylic acid | 3.5 6.5 | urea + $NH_4OH$ | 5.0 | ortho-phosphate | 12.3 | potassium acetate | 5.0 | potassium thiosulfate ZnEDTA | 2.7 0.8 |

TABLE I-continued

| Polyamine Component | wt % | Nitrogen Source | Available N (wt %) | Phosphate Source | Available P (wt %) | Potassium Source | Available K (wt %) | Secondary Nutrient | Secondary Nutrient (wt %) |
|---|---|---|---|---|---|---|---|---|---|
| poly-aspartic acid; amino polycarboxylic acid | 7.5 1.5 | NH$_4$OH | 2.0 | — | 0.0 | potassium formate | 20.0 | FeEDDHSA CoEDTA MgEDTA | 3.6 1.8 0.9 |
| poly-aspartic acid | 10.0 | urea | 7.5 | ortho-phosphate | 10.0 | potassium formate | 3.0 | CaEDTA CuEDTA | 1.4 6.8 |

Unless defined otherwise, all technical and scientific terms used herein have the same meaning as commonly understood by one of ordinary skill in the art to which the presently disclosed subject matter pertains. Representative methods, devices, and materials are described herein, but are not intended to be limiting unless so noted.

The terms "a", "an", and "the" refer to "one or more" when used in the subject specification, including the claims. The term "ambient temperature" as used herein refers to an environmental temperature of from about 0° F. to about 120° F., inclusive. The term "hard water" refers to water with having at least 60 ppm hardness as defined by the United States Geological Survey.

Unless otherwise indicated, all numbers expressing quantities of components, conditions, and otherwise used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, or percentage can encompass variations of, in some embodiments ±20 wt %, in some embodiments ±10 wt %, in some embodiments ±5 wt %, in some embodiments ±1 wt %, in some embodiments ±0.5 wt %, and in some embodiments to ±0.1 wt %, from the specified amount, as such variations are appropriate in the disclosed application.

All compositional percentages used herein are presented on a "by weight" basis, unless designated otherwise.

It is understood that, in light of a reading of the foregoing description, those with ordinary skill in the art will be able to make changes and modifications to the present invention without departing from the spirit or scope of the invention, as defined herein. For example, those skilled in the art may substitute materials supplied by different manufacturers than specified herein without altering the scope of the present invention.

What is claimed is:

1. A composition for an aqueous fertilizer product consisting of:
    a) at least 20 wt % water,
    b) soluble nitrogen selected from a nitrogen source that does not form insoluble particulates by reacting with calcium ions, magnesium ions, iron ions, bicarbonates, and combinations thereof,
    c) a potassium salt wherein said potassium salt does not form insoluble particulates by reacting with calcium ions, magnesium ions, iron ions, bicarbonates, and combinations thereof,
    d) an orthophosphate derived from a purified phosphoric acid solution,
    e) a polyamine compatibility agent selected from the group consisting of a poly-aspartic acid or an amino polycarboxylic acid or a combination thereof, and
    f) optionally, a supplemental nutrient selected from the group consisting of sulfur, zinc, boron, calcium, manganese, iron, copper, cobalt, magnesium, or a combination thereof;
    wherein the composition is prepared by slowly adding to water the other composition ingredients, and then mixing at ambient temperature for at least 60 minutes while ensuring that the temperature is held below 50° C., and wherein the polyamine component remains unchelated in the aqueous fertilizer product to a sufficient degree that the polyamine component forms chelates with divalent cations in water having at least 60 ppm hardness as defined by the United States Geological Survey and wherein the finished fertilizer product is in liquid form.

2. The composition of claim 1 wherein the polyamine compatibility agent comprises from about 1.0 wt % up to about 10.0 wt % of the composition.

3. The composition of claim 1 wherein said soluble nitrogen is urea, triazone urea, ammonium hydroxide, or a combination thereof.

4. The composition of claim 1 wherein said phosphate source is an orthophosphate derived from a purified phosphoric acid solution.

5. The composition of claim 1 wherein the potassium salt is selected from potassium hydroxide, potassium phosphate, a carboxylic acid salt of potassium, or a combination thereof, wherein the carboxylic acid salt of potassium is selected from (1) HCOOK, or (2) CH$_3$(CH$_2$)$_x$COOK wherein x=0-4, or (3) MOOC(CR$^1$R$^2$)$_x$COOK wherein R$^1$=—H or —OH or —COOM and R$^2$=—H or —OH or —COOM and x=0-4 and M=H or K, or (4) HO(CR$^1$R$^2$)$_x$COOK wherein R$^1$=H or a C1 to C4 alkyl group and R$^2$=H or a C1 to C4 alkyl group and x=1-5, or (5) CH$_3$CO(CR$^1$R$^2$)$_x$COOK wherein R$^1$=H or a C1 to C4 alkyl group and R$^2$=H or a C1 to C4 alkyl group and x=1-3.

6. The composition of claim 5 wherein said potassium salt is potassium acetate, potassium formate, potassium citrate, potassium succinate, potassium propionate, potassium hydroxide, potassium phosphate, or a combination thereof.

7. The composition of claim 6 wherein said potassium salt is potassium acetate.

8. The composition of claim 1 wherein the soluble nitrogen delivers available nitrogen at a concentration of from about 0.0 wt % to about 10 wt % of the composition, the potassium salt delivers available potassium in the form of $K_2O$ at a concentration of from about 1.0 wt % to about 23 wt %, the phosphate source delivers available phosphorus in the final composition of from about 0.0 wt % to about 23.0 wt %, the polyamine compatibility agent comprises from about 1.0 wt % to about 4.0 wt %, and the supplemental nutrient comprises from about 0.0 wt % to about 9.0 wt %.

\* \* \* \* \*